UNITED STATES PATENT OFFICE.

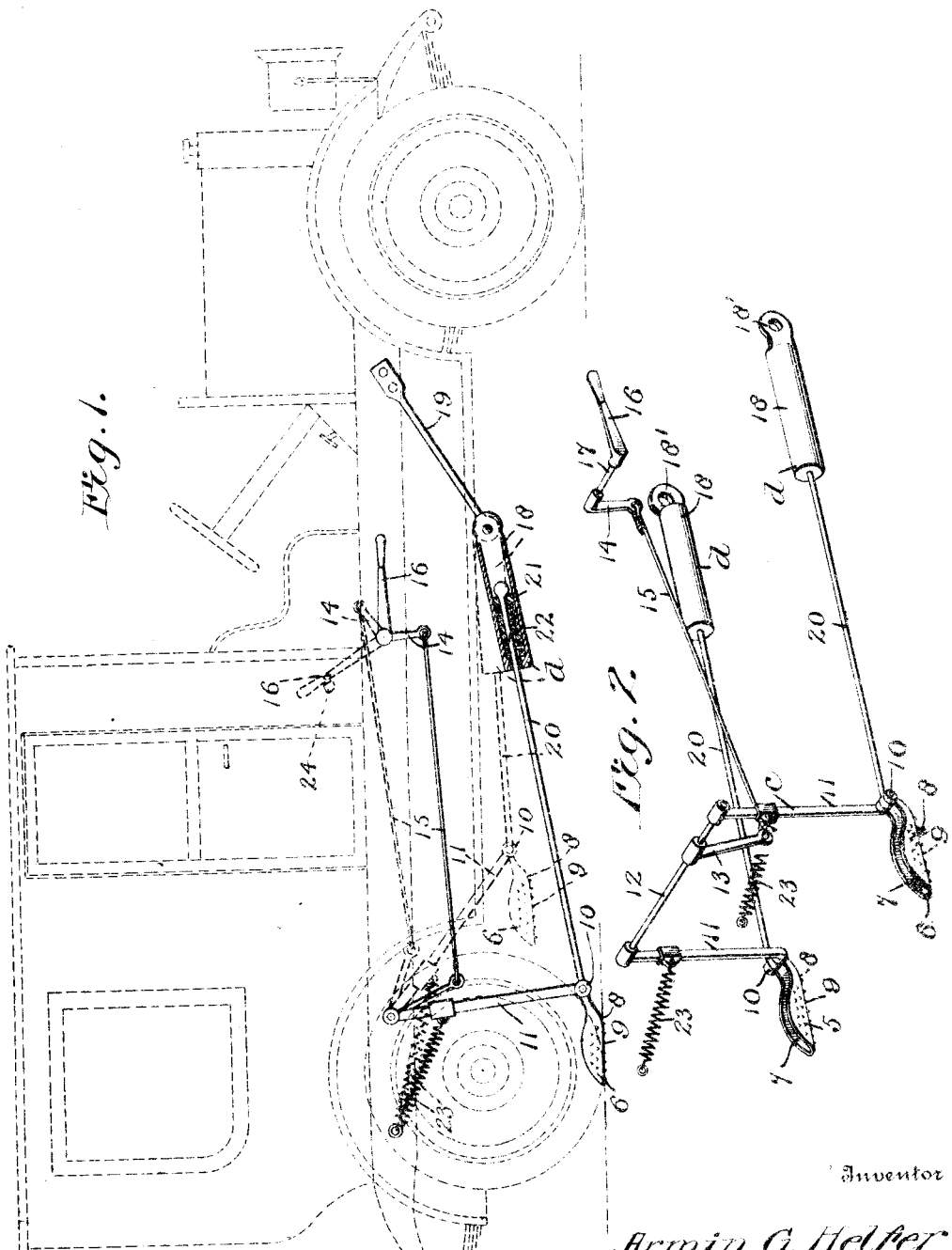

ARMIN G. HELFER, OF NEW YORK, N. Y.

VEHICLE-BRAKE.

1,138,561.   Specification of Letters Patent.   Patented May 4, 1915.

Application filed September 16, 1913. Serial No. 790,079.

*To all whom it may concern:*

Be it known that I, ARMIN G. HELFER, a citizen of the Republic of Switzerland, residing at New York, in the county of New York and State of New York, have invented new and useful Improvements in Vehicle-Brakes, of which the following is a specification.

The general object of this invention is to effect the instantaneous stopping of a vehicle without the jar or shock resulting therefrom. And to these ends the invention consists of a pair of spring-actuated pivoted shoes adapted to be swung downwardly and under the rear wheels of the vehicle and shock absorbing elements connected to the said shoes.

Other objects will appear and be better understood from that embodiment of my invention of which the following is a specification, reference being had to the accompanying drawings forming part thereof, in which:—

Figure 1 is a side elevational view of my invention attached to a motor vehicle shown in dotted lines and, Fig. 2 is a perspective view of the skids or shoes and operating mechanism shown disconnected from the vehicle.

The brake consists of the shoes 5 and 6, the operating mechanism c and the shock absorbers d.

The shoes 5 and 6 are each provided with the channel portion 7 which admits of the shoe straddling the wheel of the vehicle. The under face 8 of the shoe is relatively flat, and is provided with the teeth 9; these teeth are also mounted at the sides, adjacent to the under face, and are provided so as to bite into the surface of the road when the brake is applied. The shoe also is provided with the knuckle 10, by which it is pivoted to the arm 11; these arms are connected at their upper ends by the rod 12. This rod may be journaled in any suitable manner in the chassis of the vehicle so that when turned, it will swing the arms forwardly and rearwardly. A lever 13 is secured to the connecting-rod and is connected to a second lever 14 by the cable 15. The second named lever 14 is rigidly secured to the handle 16 by the rod 17, which is mounted on the frame of the vehicle, adjacent to the operator's seat, so that the handle will be within easy reach of the operator. It will be noted by referring to the drawings, that the lever 14 and the handle 16 coöperate to form a bell-crank.

The shock absorber d consists of a barrel 18, having one end closed and provided at its opposite end with a longitudinally disposed ear 18'. A rod 19 depending from the frame of the vehicle, is pivoted to the ear and supports the ear-end of the barrel. The closed end of the barrel is bored to receive one end of a shaft 20 which functions as a plunger for the barrel and is connected at its opposite end to the lower end of the arm 11. The end of the shaft inserted in the barrel is provided with a knob and carries the washer 21, which bears against the spring 22 when the plunger is drawn outwardly. A spring 23 is secured to a sleeve carried by the arm 11 and has its other end connected to the frame of the vehicle. This spring is tensioned when the brake is off and will when desired, cause the brake to assume the position shown in full lines in Fig. 1.

As shown in Fig. 1 the dotted lines show the brake in the inoperative position. The stop 24 limits the backward movement of the handle 16, and it will be seen the lever 14 is off center. This position prevents the automatic return of the handle to the position shown in full lines, as the tendency of the spring will be to cause the handle to go back farther. Obviously the handle will remain set until pushed over by the chauffeur. When the brake is off, the shaft 20 will be progressed farther into the barrel and the spring 22 will be expanded upon the handle being turned over from the dotted line position to full line position. The spring 23, as above described will swing the skids downwardly and under the wheels. As this movement occurs, the shaft 20 is being withdrawn from the barrel and the spring 22 is being compressed. This compression of the spring softens the sudden stop of the vehicle and absorbs the shock arising from the instantaneous application of the brakes.

What is claimed as new is:

In combination with a wheel mounted vehicle, a brake comprising a rod journaled to the body of the vehicle, a lever fixed to the rod, a bell crank lever fulcrumed to the body of the vehicle and so arranged that its working end swings from a point above to a point below, and vice versa, the fulcrum point of the said bell crank lever when the said lever is swung, means operatively connecting the free end of the first mentioned lever with the working end of the bell crank lever, an arm fixed to said rod, a shoe carried by the arm and adapted to pass under the wheel of the vehicle when the rod is turned, a spring connected at one end with the arm and at its other end with the body of the vehicle and being under tension to normally hold the shoe toward the wheel, a shock absorber including relatively movable members one of which is connected with the body of the vehicle and the other connected with the free end portion of the arm and a spring engaging both of said members and being under tension with a tendency to draw the shoe away from the wheel.

In testimony whereof I affix my signature in presence of two witnesses.

ARMIN G. HELFER.

Witnesses:
WM. E. PALMER,
GEO. A. BYRNE.